United States Patent [19]
Thomaides et al.

[11] Patent Number: 5,962,400
[45] Date of Patent: Oct. 5, 1999

[54] AMINO ACID COPOLYMERS HAVING PENDENT POLYSACCHARIDE MOIETIES AND USES THEREOF

[75] Inventors: John S. Thomaides, Berkeley Heights, N.J.; Klein A. Rodrigues, Signal Mountain, Tenn.; Paul M. Petersen, Princeton, N.J.

[73] Assignee: National Starch and Chemical Investment Holding Corporation, Wilmington, Del.

[21] Appl. No.: 09/218,584

[22] Filed: Dec. 22, 1998

[51] Int. Cl.$^6$ .......................................................... C11D 3/37
[52] U.S. Cl. ............................................. 510/471; 510/475
[58] Field of Search ...................... 510/471, 475

[56] References Cited

U.S. PATENT DOCUMENTS

| | | | |
|---|---|---|---|
| 3,485,762 | 12/1969 | Gower et al. | 252/152 |
| 4,444,561 | 4/1984 | Denzinger et al. | 8/137 |
| 5,008,032 | 4/1991 | Diessel et al. | 252/174.24 |
| 5,541,341 | 7/1996 | Vermeer et al. | 548/517 |
| 5,580,941 | 12/1996 | Krause et al. | 527/300 |
| 5,668,098 | 9/1997 | Gutierrez et al. | 510/350 |
| 5,739,093 | 4/1998 | Gutierrez et al. | 510/276 |

FOREIGN PATENT DOCUMENTS

| | | |
|---|---|---|
| 0 753 570 | 1/1997 | European Pat. Off. .......... C11D 3/37 |
| WO 96/16930 | 6/1996 | WIPO . |
| WO 97/47199 | 12/1997 | WIPO . |

OTHER PUBLICATIONS

Gebhard Thoma et al., "Synthesis and Characterization of Polyaspartic Acid–Carbohydrate Conjugates: Multivalent Sialyl Lewis", Bioorganic & Medicinal Chemistry Letters, 1997, vol. 7, No. 13, pp. 1705–1708.

*Primary Examiner*—Yogendra Gupta
*Assistant Examiner*—John R. Hardee
*Attorney, Agent, or Firm*—John D. Thallemer

[57] ABSTRACT

A water-soluble or water-dispersible amino acid copolymer having pendent polysaccharide moieties. The invention also provides a method for cleaning an article and a method of providing soil resistance to an article using the amino acid copolymer having pendent polysaccharide moieties. The amino acid copolymers are useful in cleaning compositions such as laundry detergents, dishwashing detergents, prespotters, fabric softeners, and hard surface cleaners.

7 Claims, No Drawings

AMINO ACID COPOLYMERS HAVING PENDENT POLYSACCHARIDE MOIETIES AND USES THEREOF

FIELD OF THE INVENTION

The present invention relates to water-soluble or water-dispersible amino acid copolymers having pendent polysaccharide moieties. The invention also provides a method for cleaning an article and a method of providing soil resistance to an article using the amino acid copolymers having pendent polysaccharide moieties.

BACKGROUND OF THE INVENTION

The primary objective of a cleaning composition is to remove soil from an article. In the case where the cleaning composition is a laundry detergent and the article to be cleaned is not highly stained, surfactants, builders and enzymes formulated into most detergents are adequate to completely remove soil from the article. When stronger cleaning power is needed to remove soil from the article other products such as bleach or laundry boosters are used in addition to the detergent. In addition, washing with hotter water, using longer wash cycles, pre-soaking the soiled article in an aqueous solution containing detergent, or using a spot pretreater are helpful for removing soil.

However, where the article is heavily soiled, or where the soil has penetrated into the article, surfactants, builders, enzymes, bleach, or laundry boosters are not always completely effective in removing soil from an article. Spot pretreaters are useful, but they need to be applied to the stained area prior to washing requiring an inconvenient additional step in the washing process. Additionally, certain soils are particularly difficult to remove from certain types of articles. For example, oil based soils are particularly difficult to remove from synthetic fabrics, and ground in clay or particulate stains are particularly difficult to remove from cotton fabrics. In addition, removing soil can be made more difficult when soil which is suspended in the washing process redeposits onto the article.

Soils commonly found on stained articles include oil and oily particulate stains such as frying oils or grease, sauces like tomato or spaghetti sauce, tea or coffee stains; non-saponifiable oil stains such as used motor oil or petroleum oils; grass stains; enzyme sensitive stains such as fats or proteins; and mineral stains such as clays.

Several solutions have been proposed for improving the cleaning of an article. One proposed solution for cleaning of an article is to add a "soil removal agent" to a cleaning composition to increase soil removal from the article during cleaning. Another proposed solution involves protecting an article with a "soil resistant agent" so that soil is not deposited as easily on the article in comparison to another article not protected by the soil resistant agent. The soil resistant agent may also act to protect the article by making soil on an article easier to remove in comparison to another article which was not protected by the soil resistance agent before being soiled. Another proposed solution involves adding an agent which inhibits soil which has been removed from an article during cleaning from depositing onto the same or different article.

U.S. Pat. No. 3,485,762 describes using styrene-maleic anhydride copolymers derivatized with polyethylene glycols in detergent compositions. While the detergent compositions are effective for removing soil from hydrophobic articles such as polyester, such copolymers are not as effective on hydrophilic articles such as cotton.

U.S. Pat. No. 4,444,561 describes using copolymers prepared from 50 to 90 weight percent of a vinyl ester of $C_1$–$C_4$ aliphatic carboxylic acids, from 5 to 35 weight percent of a N-vinyl lactam, and from 1 to 20 weight percent of a monomer containing basic nitrogen capable of forming a salt or quaternized product, in detergent compositions to inhibit soil redeposition. The disadvantage of using such copolymers, however, is that they are capable of forming cations which may complex with anionic surfactants under certain wash conditions and cause a decrease in cleaning performance. In addition, the cationic copolymers may also undesirably promote fabric graying over multiple washing cycles.

U.S. Pat. No. 5,008,032 describes using copolymers prepared from $C_4$–$C_{28}$ olefins and $\alpha,\beta$-ethylenically unsaturated dicarboxylic anhydrides in detergent formulations. The disadvantage of using such copolymers, however, is that the copolymers are not water-soluble unless hydrolyzed with NaOH.

U.S. Pat. No. 5,580,941 describes the use of a water-soluble, acid-group group containing graft copolymer as a biodegradable builder in detergent formulations. The graft copolymer is obtained by copolymerizing a monomer mixture in the presence of a sugar. The monomer mixture contains a monoethylenically unsaturated $C_3$ to $C_{10}$ monocarboxylic acid, or salt thereof with a monovalent cation, and a monoethylenically unsaturated monomer comprising a monosulfonic acid group, monoethylenically unsaturated sulfuric acid ester, vinylphosphonic acid or salt thereof with a monovalent cation. The disadvantage of using such copolymers, however, is that they do not have any soil release properties.

European Patent Application 753 570 A2 describes a soil removal and soil resistant detergent composition containing a vinyl amide polymer which is prepared from 5 to 100 weight percent of a vinyl amide monomer and from 0 to 95 weight percent of a vinyl ester monomer. While the detergent compositions are effective for removing soil from hydrophobic articles such as polyester, such compositions are not as effective for cleaning hydrophilic substrates such as cotton.

U.S. patent application Ser. No. 09/025,002, filed Feb. 17, 1998, describes polymers having pendent polysaccharide moieties. The polymer backbone is prepared from ethylenically unsaturated monomers by an addition polymerization reaction.

SUMMARY OF THE INVENTION

Accordingly, it is an object of the invention to provide a polymer which improves the cleaning properties of cleaning compositions by removing soil.

It is another object of the invention to provide a polymer which improves the cleaning properties of cleaning compositions by inhibiting the redeposition of soil from the cleaning process onto an article.

It is also an object of the invention to provide a polymer which imparts soil resistance to an article.

It is a further object of the invention to provide a polymer which is compatible with other components used in a cleaning composition and which improves the cleaning properties of cleaning compositions by removing soil from hydrophilic and hydrophobic articles.

With regard to the foregoing and other objects, the present invention provides a water-soluble or water-dispersible amino acid copolymer having pendent polysaccharide moieties having the structure

[a]
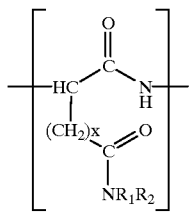

[b]
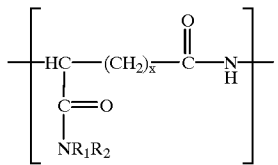

[c]
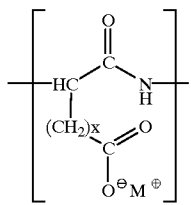

[d]
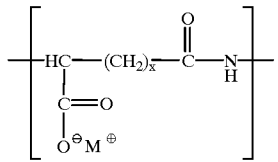

[e]
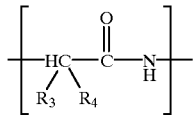

[f]
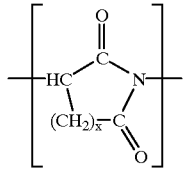

wherein $M^+$ is a cation selected from the group consisting of H+, ammonium, alkali metals, alkaline earth metals, $Zn^{2+}$, $Cu^{2+}$, quaternary organic amines, amino acids, and protonated amino saccharides; units [a], [b], [c], [d], [e] and [f] are present in random order; the mole percent of (a+b) is from 5 to 100; the mole percent of (c+d) is from 0 to 95; the mole percent of (e) is from 0 to 95; the mole percent of (f) is from 0 to 95; $R_1$ and $R_2$ are independently selected from the group consisting of hydrogen, an alkyl group having 1 to 4 carbon atoms, and a saccharide moiety having the structure (I)

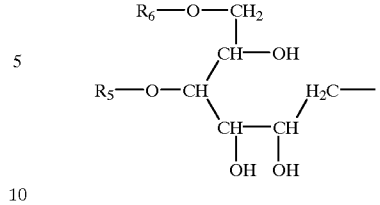
(I)

wherein $R_5$ is hydrogen or is represented by structure I(a)

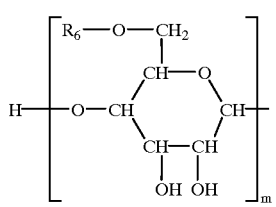
(I(a))

and $R_6$ is hydrogen or is represented by structure I(a) or structure I(b)

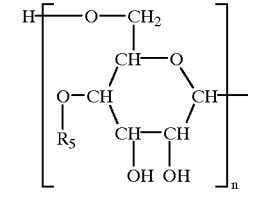
(I(b))

provided that at least one of $R_1$ or $R_2$ is a saccharide moiety; $R_3$ and $R_4$ are independently selected from the group consisting of hydrogen, an alkyl group having 1 to 12 carbon atoms, and a residue of an amino acid other than aspartic acid and glutamic acid; and (m+n) is greater than or equal to 0.

According to another aspect the invention provides a cleaning composition comprising a water-soluble or water-dispersible amino acid copolymer having pendent polysaccharide moieties having the structure

[a]
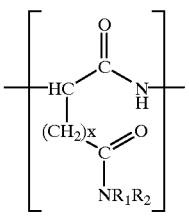

[b]
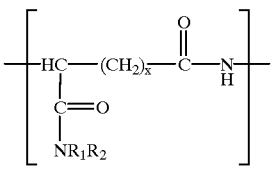

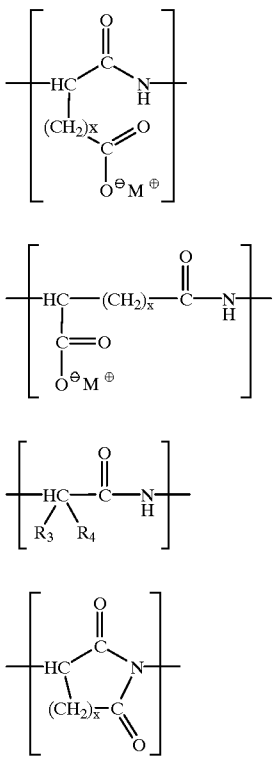

wherein M⁺ is a cation selected from the group consisting of H+, ammonium, alkali metals, alkaline earth metals, $Zn^{2+}$, $Cu^{2+}$, quaternary organic amines, amino acids, and protonated amino saccharides; units [a], [b], [c], [d], [e] and [f] are present in random order; the mole percent of (a+b) is from 5 to 100; the mole percent of (c+d) is from 0 to 95; the mole percent of (e) is from 0 to 95; the mole percent of (f) is from 0 to 95; $R_1$ and $R_2$ are independently selected from the group consisting of hydrogen, an alkyl group having 1 to 4 carbon atoms, and a saccharide moiety; provided that at least one of $R_1$ or $R_2$ is a saccharide moiety; $R_3$ and $R_4$ are independently selected from the group consisting of hydrogen, an alkyl group having 1 to 12 carbon atoms, and a residue of an amino acid other than aspartic acid and glutamic acid; and (m+n) is greater than or equal to 0.

According to another aspect the invention provides a method for preparing the water-soluble or water-dispersible amino acid copolymer having pendent polysaccharide moieties, said method comprises: (I) dissolving at least one amino acid polymer having 5 to 100 mole percent of (f) units in a polar aprotic solvent to form a solution; (II) adding at least one amine containing polysaccharide to the solution formed in Step (I) to form a mixture, wherein the amine containing polysaccharide has the structure

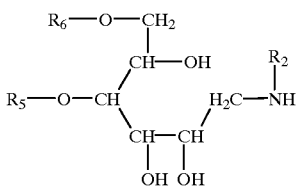

and (III) heating the mixture formed in Step (II) at a temperature of from about 30° C. to about 120° C. for a sufficient time to react the amino acid polymer with the amine containing polysaccharide. Preferably, the polar aprotic solvent is removed from the amino acid copolymer having pendent polysaccharide moieties by evaporation or precipitation.

According to another aspect the invention provides a method for preparing the water-soluble or water-dispersible amino acid copolymer having pendent polysaccharide moieties, said method comprises: (I) forming a mixture comprising water, at least one amine containing polysaccharide and at least one amino acid polymer having 5 to 100 mole percent of (f) units; and (II) heating the mixture at a pH greater than 9 in the presence of a sufficient amount of base in order to maintain the pH above 9 and at a temperature of from about 30° C. to about 100° C. for a sufficient time to react the amino acid polymer with the amine containing polysaccharide. Preferably the water is removed from the amino acid copolymer having pendent polysaccharide moieties by evaporation, freeze drying, or spray drying.

According to another aspect the invention provides a method for preparing the water-soluble or water-dispersible amino acid copolymer having pendent polysaccharide moieties, said method comprises: (I) forming a mixture comprising water, at least one amine containing polysaccharide and at least one amino acid polymer having 5 to 100 mole percent of (f) units; and (II) heating the mixture at a pH of less than 12 and at a temperature of from about 30° C. to about 100° C. for a sufficient time to react the amino acid polymer with the amine containing polysaccharide.

According to another aspect the invention provides a method of cleaning which involves preparing a cleaning composition comprising the amino acid copolymer having pendent polysaccharide moieties, contacting the cleaning solution with one or more articles, wherein at least one of the articles contains soil, and removing at least a portion of the soil from the article containing soil.

According to a further aspect the invention provides a method of imparting soil resistance to an article which involves preparing a cleaning composition comprising the amino acid copolymer having pendent polysaccharide moieties, and contacting the cleaning composition with the article to provide soil resistance to the article.

The amino acid copolymer having pendent polysaccharide moieties when used in a cleaning process, removes soil from articles, inhibit soil deposition on articles, and provide soil resistance to articles. Examples of cleaning compositions containing the amino acid copolymers having pendent polysaccharide moieties are laundry detergents, prespotters, dishwashing detergents, and hard surface cleaners. The amino acid copolymers having pendent polysaccharide moieties are sufficiently hydrophobic to absorb to an article such as cloth in a washing process yet retain enough hydrophilic character to decrease the hydrophobic nature of an article such as polyester.

DESCRIPTION OF THE INVENTION

The water-soluble or water-dispersible amino acid copolymer having pendent polysaccharide moieties has the structure

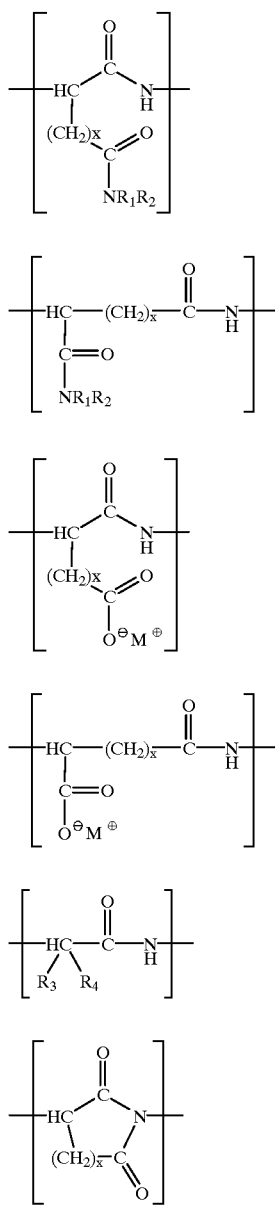

As used herein, "pendent" means that the amine containing polysaccharide moieties are attached to the amino acid copolymer backbone. Pendent should not be read in the strict sense which would exclude the attachment of such groups at the terminal end of a polymer chain.

In the above structure for the amino acid copolymer having pendent polysaccharide moieties, $M^+$ is a cation selected from the group consisting of H+, ammonium, alkali metals, alkaline earth metals, $Zn^{2+}$, $Cu^{2+}$, quaternary organic amines, amino acids, and protonated amino saccharides.

The units [a], [b], [c], [d], [e] and [f] are present in random order. The mole percent of (a+b) is from 5 to 100, preferably from 10 to 50, more preferably from 15 to 30. The mole percent of (c+d) is from 0 to 95, preferably from 50 to 90, more preferably from 70 to 85. The mole percent of (e) is from 0 to 90. The mole percent of (f) is from 0 to 90. The (f) units are derived from glutamic acid and/or aspartic acid.

$R_1$ and $R_2$ are independently selected from the group consisting of hydrogen, an alkyl group having 1 to 4 carbon atoms, and a saccharide moiety having the structure (I)

$$R_6-O-CH_2 \atop R_5-O-CH \quad CH-OH \atop \quad\quad CH-CH \quad H_2C- \atop \quad\quad OH\ OH \tag{I}$$

wherein $R_5$ is hydrogen or is represented by structure I(a)

$$\left[\begin{array}{c} R_6-O-CH_2 \\ CH-O \\ H-O-CH \quad CH- \\ CH-CH \\ OH\ OH \end{array}\right]_m \tag{I(a)}$$

and $R_6$ is hydrogen or is represented by structure I(a) or structure I(b)

$$\left[\begin{array}{c} H-O-CH_2 \\ CH-O \\ O-CH \quad CH- \\ R_5 \quad CH-CH \\ OH\ OH \end{array}\right]_n \tag{I(b)}$$

provided that at least one of $R_1$ or $R_2$ is a saccharide moiety.

The saccharide moiety may be a amine containing polysaccharide or a monosaccharide moiety. The amino acid polymer having pendent polysaccharide moieties may be prepared with a combination of polysaccharide moieties and monosaccharide moieties. The saccharide moiety is derived from a saccharide which is selected from the group consisting of starches, hydrolyzed starches, glucose, lactose, maltose, maltodextrins, corn syrup solids, cellulose, hydrolyzed cellulose, dextran, hydrolyzed dextran, guar gum, hydrolyzed guar gum, locust bean gum, hydrolyzed locust bean gum, and combinations thereof. Suitable starches include, for example, corn, potato, tapioca, and rice.

The sum of (m+n) is greater than or equal to 0. Preferably, the sum of (m+n) is from 0 to 1000. More preferably, the sum of (m+n) is from 2 to 20.

$R_3$ and $R_4$ are independently selected from the group consisting of hydrogen, an alkyl group having 1 to 12 carbon atoms, and a residue of an amino acid other than aspartic acid and glutamic acid. Preferably $R_3$ and $R_4$ are independently selected from the group consisting of an amino alkyl, (aminoiminomethyl)amino alkyl, (1H-imidazol-4-yl) alkyl, amino oxo alkyl, hydrogen, an alkyl group having 1 to 12 carbon atoms, phenyl alkyl, (hydroxyphenyl)alkyl, indole alkyl, hydroxy alkyl, mercapto alkyl, and (methylthio) alkyl. More preferably, $R_3$ and $R_4$ are independently selected from the group consisting of 4-aminobutyl, 3-[(aminoiminomethyl)amino]propyl, (2-amino-2-oxoethyl, 3-amino-3-oxopropyl, hydrogen, methyl, 1 -(methyl)ethyl, 2-(methyl)propyl, 1 -(methyl)propyl, phenylmethyl (4-hydroxyphenyl)methyl, indole methyl, hydroxymethyl, mercaptomethyl, 1 -(hydroxy)ethyl, and 2-(methylthio) ethyl.

The amino acid copolymer having pendent polysaccharide moieties has repeating units selected from the group consisting of aspartic acid, glutamic acid and combinations thereof and, optionally, additional repeating units selected from the groups consisting natural and synthetic amino acids. Examples of natural amino acids include lysine, arginine, histidine, asparagine, glutamine, proline, glycine, alanine, valine, leucine, isoleucine, phenylalanine, tyrosine, tryptophan, serine, cysteine, threonine, methionine, and cystine. Examples of synthetic amino acids include amino benzoic acid, 6-amino hexanoic acid, and 11-amino undecanoic acid.

In one embodiment of the invention, $R_1$ is a saccharide moiety having the structure (I); $R_1$ and $R_6$ are hydrogen; and $R_2$ is hydrogen or an akyl group having 1 to 4 carbon atoms.

In one embodiment of the invention, $R_1$ is a saccharide moiety having the structure (I); $R_5$ is represented by structure I(a); $R_6$ is hydrogen; $R_2$ is hydrogen or an akyl group having 1 to 4 carbon atoms; and m=1.

In one embodiment of the invention, $R_1$ is a saccharide moiety having the structure (I); $R_5$ is hydrogen or is represented by structure I(a); $R_6$ is hydrogen or is represented by structure I(a) or structure I(b); $R_2$ is hydrogen or an akyl group having 1 to 4 carbon atoms; and (m+n) is 2–20.

In one embodiment of the invention, the amine containing polysaccharide is prepared by reductive amination of a saccharide containing a reducing end group with at least one compound selected from the group consisting of ammonia, a primary amine, hydrazine, and hydroxyl amine. Preferably the reductive amination reaction is conducted in water without a cosolvent and involves mixing a saccharide with an amine in water, and then contacting the mixture with pressurized hydrogen in the presence of a Group VIIIB metal catalyst and under conditions effective to produce an amino saccharide. Methods for preparing the amine containing polysaccharide are disclosed in U.S. Pat. No. 5,654, 198 which is incorporated herein by reference.

The water-soluble or water-dispersible amino acid polymer with pendent saccharide moieties is prepared by either condensing an aspartic acid or glutamic acid copolymer with an amine containing saccharide to form a modified amino acid polymer or by the ring opening reaction of an amine containing saccharide with a succinimide copolymer or glutimide copolymer. The time of reaction according to the present invention is preferably from about 10 minutes to 48 hours, more preferably from about 1 hour to about 8 hours.

In one embodiment of the invention, the water-soluble or water-dispersible amino acid copolymer having pendent polysaccharide moieties is prepared by a method comprising: (I) dissolving at least one amino acid polymer having 5 to 100 mole percent of (f) units in a polar aprotic solvent to form a solution; (II) adding at least one amine containing polysaccharide to the solution formed in Step (I) to form a mixture, wherein the amine containing polysaccharide has the structure

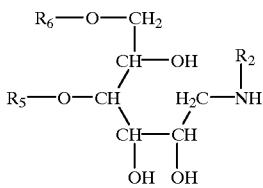

and (III) heating the mixture formed in Step (II) at a temperature of from about 30° C. to about 120° C. for a sufficient time to react the amino acid polymer with the amine containing polysaccharide. Preferably, the polar aprotic solvent is removed from the amino acid copolymer having pendent polysaccharide moieties by evaporation or precipitation.

While not wishing to be bound by any particular theory, the inventors believe that the amine containing saccharide reacts by means of a condensation reaction with the (f) units on the amino acid polymer to form (a) and (b) units.

In one embodiment of the invention, the water-soluble or water-dispersible amino acid copolymer having pendent polysaccharide moieties is prepared by a method comprising: (I) forming a mixture comprising water, at least one amine containing polysaccharide and at least one amino acid polymer having 5 to 100 mole percent of (f) units; and (II) heating the mixture at a pH greater than 9 in the presence of a sufficient amount of base in order to maintain the pH above 9 and at a temperature of from about 30° C. to about 100° C. for a sufficient time to react the amino acid polymer with the amine containing polysaccharide. Preferably the water is removed from the amino acid copolymer having pendent polysaccharide moieties by evaporation, freeze drying, or spray drying.

A preferred base is sodium hydroxide. While not wishing to be bound by any particular theory, the inventors believe that the amine containing saccharide reacts by means of a condensation reaction with the (f) units on the amino acid polymer to form (a) and (b) units, and water reacts with the (f) units to form (c) and (d) units. It is noted that the product contains water, an amino acid polymer having pendent polysaccharide moieties and possibly some unreacted amino saccharide units or unreacted amino acid polymer. M+ is expected to be the conjugate acid of the added base. For example, M+ is Na+ if the added base is NaOH.

In one embodiment of the invention, the water-soluble or water-dispersible amino acid copolymer having pendent polysaccharide moieties is prepared by a method comprising: (I) forming a mixture comprising water, at least one amine containing polysaccharide and at least one amino acid polymer having 5 to 100 mole percent of (f) units; and (II) heating the mixture at a pH of less than 12 and at a temperature of from about 30° C. to about 100° C. for a sufficient time to react the amino acid polymer with the amine containing polysaccharide. It is noted that the pH of the reaction in this embodiment is not adjusted and as a result is generally within the range of from about 7 to about 11. While not wishing to be bound by any particular theory, the inventors believe that M+ in this embodiment is a protonated amine containing polysaccharide. The water is removed by methods known in the art such as by evaporation.

In a preferred embodiment of the invention, the amino acid copolymer having pendent polysaccharide moieties is prepared by reacting either N-methyl glucamine or 1-amino-1-deoxy-D-sorbitol with polysuccinimide.

In a preferred embodiment of the invention, the amino acid copolymer having pendent polysaccharide moieties is prepared by reacting either N-methyl lactamine, N-methyl maltamine, lactamine or maltamine with polysuccinimide.

In a preferred embodiment of the invention, the amino acid copolymer having pendent polysaccharide moieties is prepared by reacting either N-methyl amino corn syrup solids, amino corn syrup solids, N-methyl amino maltodextrin or amino maltodextrin with polysuccinimide.

The amino acid copolymer product having pendent polysaccharide moieties in solution generally has a pH of from 3 to 9, preferably from about 8 to 9. It is noted that a pH outside of this range for an extended period of time after the polymer product is prepared subjects the polymer to degradation.

The amino acid copolymer having pendent polysaccharide moieties may be used in any cleaning composition. As used herein, "clean" means to remove soil from an article, inhibit soil deposition in a cleaning or washing process, or provide soil resistance to an article or combinations thereof. Articles which may be cleaned using the amino acid copolymers are articles which come into contact with soil and which are capable of being cleaned in a cleaning process. Examples of such articles include fabrics, such as clothing, linens, carpets, or upholstery; hard surfaces such as countertops, windows, floors, dishes, glasses or tiles; or automobiles.

The cleaning composition may be a solid or liquid composition. If the cleaning composition is solid, the cleaning composition may be in any of the usual physical forms, such as for example, powders, beads, flakes, bars, tablets, noodles, pastes, and slurries. If the cleaning composition is liquid, the cleaning composition preferably disperses or solubilizes the amino acid copolymer having pendent polysaccharide moieties so that it is easily contacted with the article. The cleaning composition may be aqueous or non-aqueous. For example, the amino acid copolymer having pendent polysaccharide moieties may be dissolved or dispersed in water, in one or more solvents or inert diluents. Preferably the cleaning composition is aqueous. The cleaning composition preferably contains the amino acid copolymer having pendent polysaccharide moieties in an amount of from about 1 to about 60 weight percent, more preferably from about 2 to about 20 weight percent, based on the total weight of the cleaning composition.

The cleaning compositions may contain any additional components which are used in cleaning compositions. Such additional components are well known to those skilled in the art and include one or more surfactants, builders, ion exchangers, alkalies, anticorrosion materials, antiredeposition materials, optical brighteners, fragrances, dyes, chelating agents, enzymes, whiteners, brighteners, antistatic agents, sudsing control agents, solvents, hydrotropes, bleaching agents, perfumes, bleach precursors, water, buffering agents, soil removal agents, soil release agents, softening agents, opacifiers, inert diluents, buffering agents, corrosion inhibitors, graying inhibitors, anti-redeposition agents, stabilizers, opacifiers, fillers, builders, phosphate co-builder, and phosphate-replacer builder. Combinations of such additional components may also be used.

Preferably cleaning compositions prepared using the amino acid copolymers having pendent polysaccharide moieties contain at least one surfactant. Suitable surfactants include nonionic, anionic, cationic, and amphoteric surfactants. The surfactants usable in the cleaning composition may also be soaps.

Anionic surfactants include, for example, from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to $C_{16}$ alkylsulfosuccinates or from $C_{12}$ to $C_{16}$ sulfated ethoxylated alkanols.

Nonionic surfactants include, for example, from $C_6$ to $C_{12}$ alkylphenol ethoxylates, from $C_{12}$ to $C_{20}$ alkanol alkoxylates, and block copolymers of ethylene oxide and propylene oxide. Optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide.

Cationic surfactants contain hydrophilic functional groups where the charge of the functional groups are positive when dissolved or dispersed in an aqueous solution. Typical cationic surfactants include, for example, amine compounds, oxygen containing amines, and quaternary amine salts.

Amphoteric surfactants contain both acidic and basic hydrophilic groups. Amphoteric surfactants are preferably derivatives of secondary and tertiary amines, derivatives of quaternary ammonium, quaternary phosphonium or tertiary sulfonium compounds. The cationic atom in the quaternary compound can be part of a heterocyclic ring. The amphoteric surfactant preferably contains at least one aliphatic group, containing about 3 to about 18 carbon atoms. At least one aliphatic group preferably contains an anionic water-solubilizing group such as a carboxy, sulfonate, or phosphono.

Generally, anionic surfactants, such as linear alkyl sulfonates (LAS) are preferred for use in solid cleaning compositions containing the amino acid copolymers having pendent polysaccharide moieties. Nonionic and anionic surfactant mixtures such as alcohol ethoxylates and LAS are preferred in liquid cleaning compositions containing the amino acid copolymers having pendent polysaccharide moieties. The surfactants are optionally present in an amount of from about 0 to about 50 weight percent, preferably from about 2 to about 45 weight percent, and more preferably from about 5 to about 40 weight percent of the cleaning composition.

Examples of builders which may be present in the cleaning composition include, for example, phosphates, such as pyrophophates, polyphosphates, or sodium tripolyphosphate. Further examples are zeolites, sodium carbonate, poly(carboxylic acids), nitrilotriacetic acid, citric acid, tartaric acid, the salts of the aforesaid acids and the monomeric, oligomeric, or polymeric phosphonates. Combinations of builders may also be used. The builders are optionally present in an amount of from 0 to about 85 weight percent, preferably from about 5 to about 50 weight percent based on the total weight of the cleaning composition.

Liquid cleaning compositions containing the amino acid copolymers having pendent polysaccharide moieties can contain up to 80 weight percent water or solvents or combinations thereof. Typical solvents which may be used include oxygen containing solvents such as alcohols, esters, glycol, and glycol ethers. Alcohols that may be used in the cleaning compositions include, for example, methanol, ethanol, isopropanol, and tertiary butanol. Esters which may be used include, for example, amyl acetate, butyl acetate, ethyl acetate, and esters of glycols. Glycols and glycol ethers that are useful as solvents include, for example, ethylene glycol, propylene glycol, and oligomers of ethylene or propylene glycol.

Solid cleaning compositions containing the amino acid copolymers having pendent polysaccharide moieties preferably contain up to 60 weight percent of one or more solid inert diluents such as sodium sulfate, sodium chloride, sodium borate, or selected polymers such as polyethylene glycol or propylene glycol.

The cleaning composition may contain 0 to about 50 weight percent of one or more buffering agents. Buffering agents include, for example, one or more alkali metal salts such as silicates, carbonates, or sulfates. Buffering agents also include, for example, organic alkalis such as triethanolamine, monoethanolamine, and triisopropanolamine.

Fabric softening agents typically include quaternary ammonium salts such as ditallowdimethyl-ammonium chloride.

Other additives which optionally may be included in the cleaning compositions especially for detergent compositions are bleaching agents, used in an amount of up to about 30 weight percent, corrosion inhibitors such as silicates used in an amount of up to about 25 weight percent, dye deposition inhibiting agents used in an amount up to about 20 weight percent, and graying inhibitors used in an amount of up to about 5 weight percent.

Suitable bleaching agents are, for example, perborates, percarbonates, or chlorine-generating substances such as chloroisocyanurates. Suitable silicates used as corrosion inhibitors are, for example, sodium silicate, sodium disilicate, and sodium metasilicate. Suitable dye deposition inhibiting agents are, for example, polyvinyl pyrrolidone. Examples of graying inhibitors are, for example, carboxymethylcellulose, methylcellulose, hydroxypropylmethylcellulose, and graft copolymers of vinyl acetate and polyalkylene oxides having a molecular weight of 1,000 to 15,000.

The cleaning composition containing the amino acid copolymers having pendent polysaccharide moieties is contacted with one or more articles, where at least one article contains soil. Contacting can be carried out, for example, by immersing the articles in the cleaning composition and agitating the articles in the cleaning composition containing the polymer. Contacting can also be accomplished by wiping, spraying, or padding the cleaning composition on the articles.

In a preferred embodiment of the invention, the amino acid copolymer having pendent polysaccharide moieties is incorporated in a detergent formulation. In a detergent formulation, the amino acid copolymers having pendent polysaccharide moieties are preferably present in an amount of from about 0.1 to about 25 weight percent, more preferably from about 0.5 to about weight percent, and most preferably from about 1 to about 5 weight percent, based on the total weight of the detergent formulation. When the detergent formulation is a laundry detergent, the amino acid copolymers having pendent polysaccharide moieties function to reduce the amount of oily soil that can adhere to the cloth. Subsequent washing of the cloth will remove more soil as a result of the reduced interactions between the soil and the cloth.

In another preferred embodiment of the invention, the amino acid copolymers having pendent polysaccharide moieties are incorporated into a prespotter formulation for direct application to a soiled fabric or carpet. The amino acid copolymers aid in removal of soil from fabric even if the fabric is washed in a laundry detergent which does not contain the polymers. When used in a prespotter formulation, the amino acid copolymers having pendent polysaccharide moieties are preferably present in an amount of from about 0.5 to about 75 weight percent, more preferably from about 1 to about 15 weight percent, and most preferably from about 2 to about 10 weight percent, based on the total weight of the prespotter formulation.

In another preferred embodiment of the invention, the amino acid copolymers having pendent polysaccharide moieties are incorporated into a fabric softening composition. The amino acid copolymers aid in release of soil during fabric softening.

The following nonlimiting examples illustrate further aspects of the invention.

EXAMPLE 1

Synthesis of amino acid Polymer A having pendent polysaccharide moieties

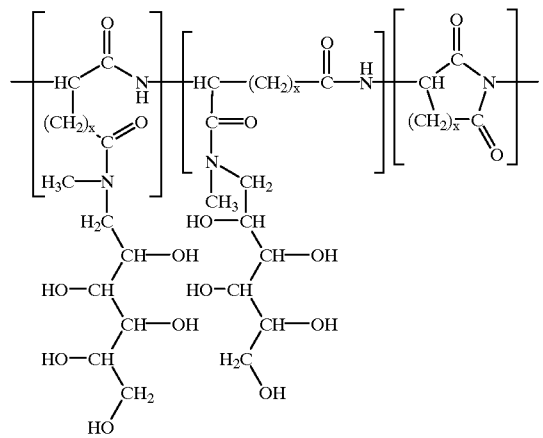

wherein x=1.

Poly(succinimide) with a weight average molecular weight of 30,000 was dried in an oven at 100° C. for 1 hr. and then cooled in a dessicator. A four-neck round bottom flask was equipped with a mechanical stirrer, thermometer, stopper and nitrogen inlet topped reflux condenser. To the round bottom flask, was charged 50 g (0.52 mole imide functionality) of the cool, dried poly(succinimide) and 390 g dimethyl sulfoxide while maintaining a positive pressure of nitrogen in the flask. The resulting mixture was warmed under a positive pressure of nitrogen to 60° C. and stirred until the poly(succinimide) had completely dissolved. To the homogenous mixture was then added 80.5 g (0.41 mole) N-methyl glucamine. Stirring under a positive pressure of nitrogen at 60° C. was continued. The progress of the reaction was followed by titrating aliquots of the reaction mixture for free amine with 0.1 N HCl. After 38 hrs. at 60° C., the reaction was determined to be complete.

The reaction product was precipitated by pouring the cooled reaction mixture into four volumes of methanol and then collected by vacuum filtration. The reaction product was washed with methanol and then dried in a forced air oven at 50° C. The yield of light brown powder was 91.0 g. Analysis by carbon-13 NMR indicated that the product contained 30 mole percent succinimide residues (f sub-units, x=1) and 70 mole percent amide residues (a+b sub-units, x=1).

EXAMPLE 2

Synthesis of amino acid Polymer B having pendent polysaccharide moieties

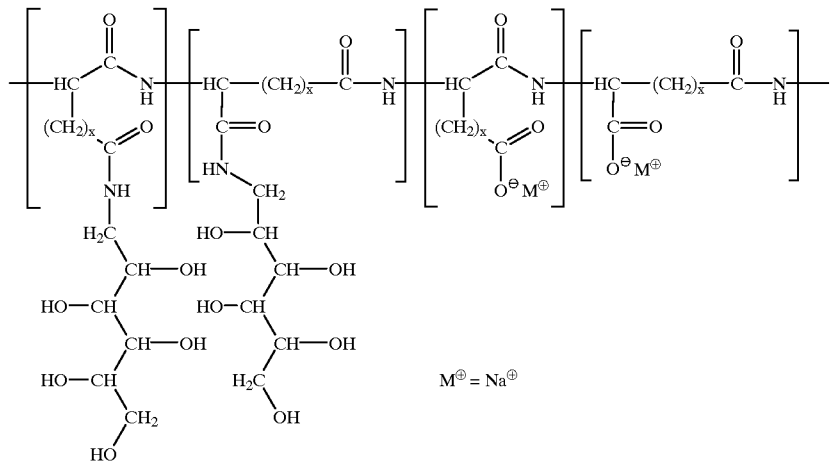

wherein x=1.

Poly(succinimide) with a weight average molecular weight of 30,000 was dried in an oven at 100° C. for 1 hr. and then cooled in a dessicator. A four-neck round bottom flask was equipped with a mechanical stirrer, thermometer, pH electrode, and reflux condenser. To the round bottom flask, was charged 30 g (0.31 mole imide functionality) of the cool, dried poly(succinimide), 250 g deionized water, and 56.0 g (0.31 mole) 1-amino-1-deoxy-D-sorbitol. The resulting mixture was warmed to 60° C., and 3.89 N NaOH was added at a rate such as to keep the reaction pH at 11.0 using an automatic pH controller. The reaction temperature was allowed to cool gradually over 4.5 hr. while the pH was maintained at 11.0. After 4.5 hr. of heating, the temperature was 40° C., 72.5 ml (0.282 moles) of 3.89 N NaOH had been added, and the solution was essentially clear. After it had cooled to room temperature (~20° C.), the pH of the solution was lowered to 10.6 by the addition of concentrated hydrochloric acid. The solution was then filtered in order remove a small amount of insoluble material.

About 15 g of the reaction mixture was then treated with AMBERLITE IR 120(p(us) strongly acidic ion exchange resin in order to remove unbound 1-amino-1-deoxy-D-sorbitol and then freeze dried. The solid obtained in this manner was then analyzed by proton NMR. The reaction product was found to be poly(aspartic acid) modified with 43 mole percent covalently bound 1-amino-1-deoxy-D-sorbitol; 43 mole percent amide residues (a+b sub-units, x=1) and 57 mole percent aspartic acid, sodium salt residues (c+d units with M+=Na+, x=1).

EXAMPLE 3

Synthesis of amino acid Polymer C having pendent polysaccharide moieties

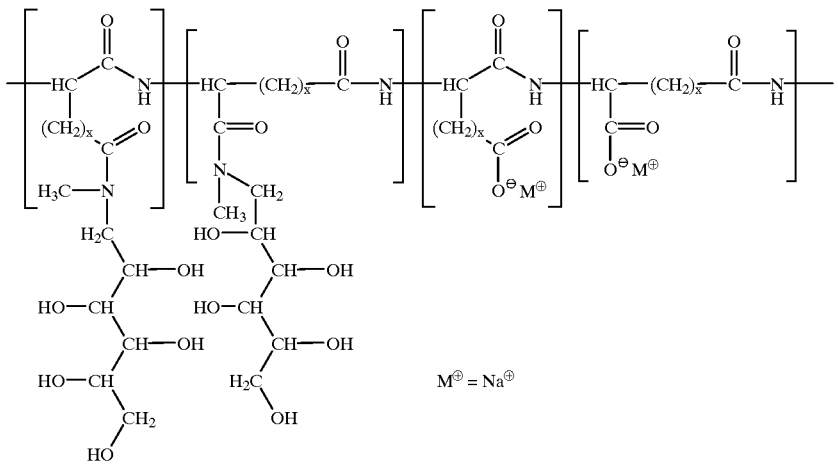

wherein x=1.

Poly(succinimide) with a weight average molecular weight of 30,000 was dried in an oven at 100° C. for 1 hr. and then cooled in a dessicator. A four-neck round bottom flask was equipped with a mechanical stirrer, thermometer, pH electrode, and reflux condenser. To the round bottom flask, was charged 30 g (0.31 mole imide functionality) of the cool, dried poly(succinimide) and 270 g deionized water, and 60.3 g (0.31 mole) N-methyl-D-glucamine. The resulting mixture was warmed to 38° C., and 3.89 N NaOH was added at a rate such as to keep the reaction pH at 11.0 using an automatic pH controller. The reaction was heated to 48 to 52° and held for 4.5 hr. and then allowed to cool to room temperature. After 4.5 hr. of heating, the temperature was 48° C., 78.6 ml (0.305 moles) of 3.89 N NaOH had been added, and the solution was essentially clear. After it had cooled to room temperature (~20° C.), the pH of the solution was lowered to 10.71 by the addition of concentrated hydrochloric acid. The solution was then filtered in order remove a small amount of insoluble material.

About 15 g of the reaction mixture was then treated with AMBERLITE IR 120(plus) strongly acidic ion exchange resin in order to remove unbound 1-amino-1-deoxy-D-sorbitol and then freeze dried. The solid obtained in this manner was then analyzed by proton NMR. The product was found to be poly(aspartic acid) modified with 13 mole percent covalently bound N-methyl glucamine; 13 mole percent amide residues (a+b sub-units, x=1) and 87 mole percent aspartic acid, sodium salt residues (c+d units with M+=Na+, x=1).

EXAMPLE 4

Synthesis of amino acid Polymer D having pendent polysaccharide moieties

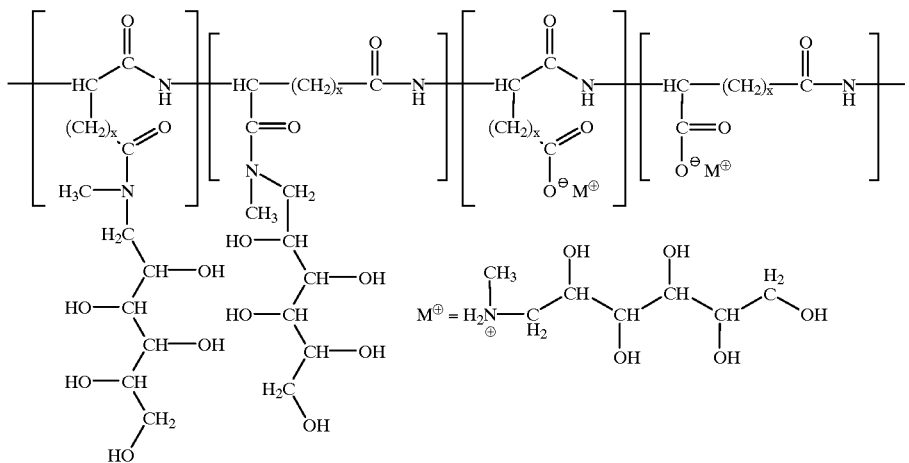

wherein x=1.

A four-neck 500 ml round bottom flask was equipped with a mechanical stirrer, thermometer, stopper, and nitrogen inlet-topped reflux condenser. To the round bottom flask, was charged 30 g (0.31 mole imide functionality) of poly (succinimide) with a weight average molecular weight of 30,000 and 270 g deionized water, and 60.3 g (0.31 mole) N-methyl-D-glucamine. The resulting mixture was gradually warmed to 78° C. and maintained at this temperature for 32 hr. After 24 hr. heating, the reaction mixture was essentially clear. After 32 hr., analysis of an aliquot of the reaction mixture indicated that there only about 7% of the N-methyl glucamine remained free (neither tonically nor covalently bound to the poly(aspartic acid) derivative). After the reaction had cooled to room temperature (~20° C.), it was filtered and then freeze dried.

The yield of solid product was 70 g. Analysis by liquid chromatography indicated that the poly(aspartic acid) polymer was modified with about 11 mole percent covalently bound N-methyl glucamine; 11% amide residue (a+b sub-units, x=1) and 89% aspartic acid, N-methyl glucammonium salt residues (c+d units with M+=N-methyl glucammonium+, x=1).

EXAMPLE 5

Synthesis of amino acid Polymer E having pendent polysaccharide moieties

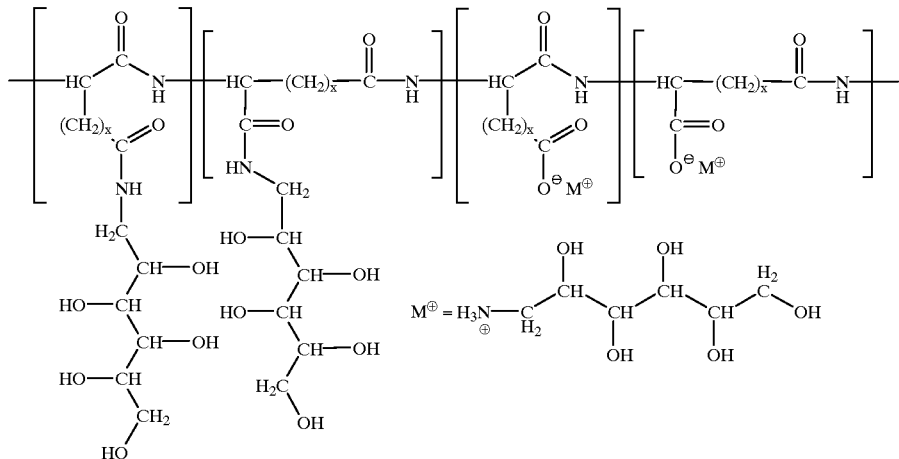

wherein x=1.

A four-neck 500 ml round bottom flask was equipped with a mechanical stirrer, thermometer, stopper, and nitrogen inlet-topped reflux condenser. To the round bottom flask, was charged 30 g (0.31 mole imide functionality) of poly (succinimide) with a weight average molecular weight of 30,000 and 250 g deionized water, and 56.0 g (0.31 mole) 1-amino-1-deoxy-D-sorbitol. The resulting mixture was gradually warmed to 80° C. and maintained at this temperature for a total of 14 hr. After 5 hr. of heating, the reaction mixture was essentially clear. After 13 hr., analysis of an aliquot of the reaction mixture indicated that only about 8% of the 1-amino-1-deoxy-D-sorbitol remained free (neither ionically nor covalently bound to the poly(aspartic acid) derivative). After the reaction had cooled to room temperature (~20° C.), it was filtered and then freeze dried.

The yield of solid product was 64.0 g. Analysis by proton NMR and liquid chromatography indicated that the poly (aspartic acid) polymer was modified with about 24 mole percent covalently bound 1-amino-1-deoxy-D-sorbitol; 24% amide residue (a+b sub-units, x=1) and 76% aspartic acid, 1-ammonium-1-deoxy-D-sorbitol salt residues (c+d units with M+=1-ammonium-1-deoxy-D-sorbitol+, x=1).

EXAMPLE 6

Synthesis of amino acid Polymer F having pendent polysaccharide moieties

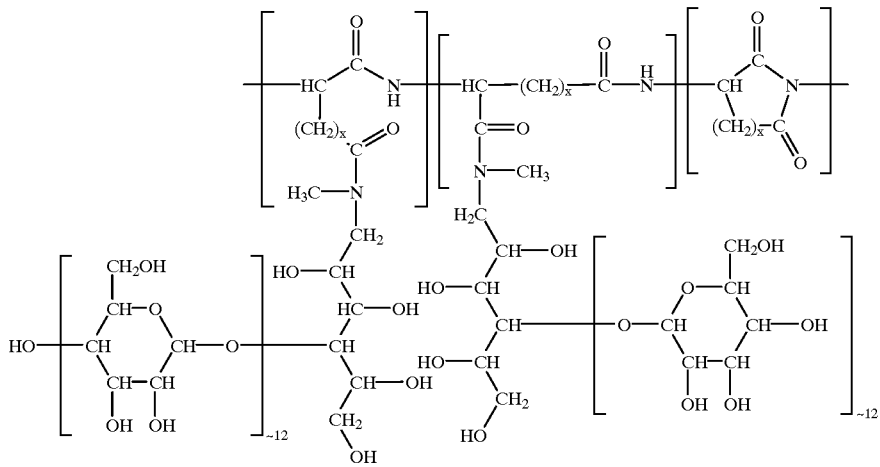

wherein x=1

A four neck round bottom flask was equipped with a mechanical stirrer, thermometer, stopper and nitrogen inlet topped reflux condenser. To the round bottom flask, was charged 10 g (0.10 mole imide functionality) of poly (succinimide) with a weight average molecular weight of 30,000 and 339 g dimethyl sulfoxide while maintaining a positive pressure of nitrogen in the flask. The resulting mixture was warmed under a positive pressure of nitrogen to 30° C. and stirred until the poly(succinimide) had completely dissolved. To the homogenous mixture was then added 103 g (0.05 mole) N-methylamino maltodextrin (number average molecular weight of about 2000). Stirring under a positive pressure of nitrogen at was continued and the temperature was gradually raised to 60° C. The progress of the reaction could be followed by titrating aliquots of the reaction mixture for free amine with 0.1 N HCl. After about 48 hr. reaction time, about half of the N-methylamino maltodextrin had reacted with poly(succinimide). The product was precipitated by pouring the cooled reaction mixture into 4 volumes of methanol and then collected by vacuum filtration. The product was washed with methanol and then dried in a forced air oven at 40° C. The yield of solid product was 81.7 g. The product was characterized by proton and carbon NMR and found to contain amide residues (a+b sub-units, x=1), succinimide residues (f sub-units, x=1), and N-methylamino maltodextrin.

EXAMPLE 7

Synthesis of amino acid Polymer G having pendent polysaccharide moieties

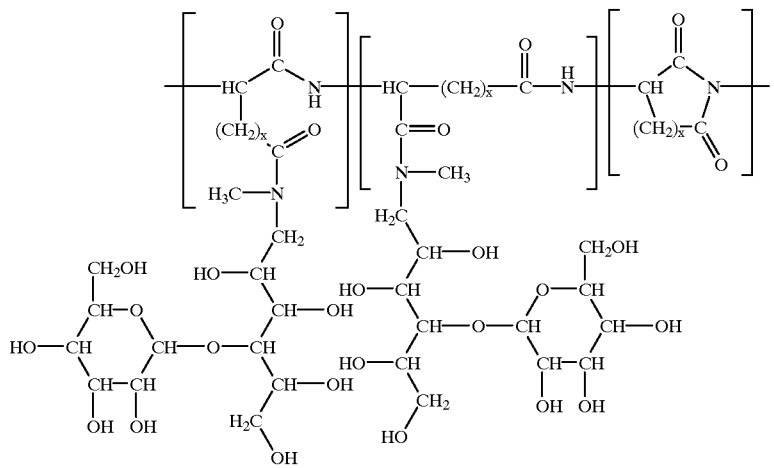

Poly(succinimide) with a weight average molecular weight of 30,000 is dried in an oven at 100° C. for 1 hr. and then cooled in a dessicator. A four neck round bottom flask is equipped with a mechanical stirrer, thermometer, stopper and nitrogen inlet topped reflux condenser. To the round bottom flask, is charged 50 g (0.52 mole imide functionality) of the cool, dried poly(succinimide) and 390 g dimethyl sulfoxide while maintaining a positive pressure of nitrogen in the flask. The resulting mixture is warmed under a positive pressure of nitrogen to 60° C. and stirred until the poly(succinimide) completely dissolves. To the homogenous mixture is then added 92.8 g (0.26 mole) N-methyl lactamine. Stirring under a positive pressure of nitrogen at 60° C. is continued. The progress of the reaction is followed by titrating aliquots of the reaction mixture for free amine with 0.1 N HCl. When the reaction is complete, the product is precipitated from the reaction mixture by pouring the cooled reaction mixture into 4 volumes of methanol and then collected by vacuum filtration. The product is washed with methanol and then dried in a forced air oven at 50° C.

EXAMPLE 8

The polymers prepared in Examples 1 and 5 were evaluated for soil release in a TERG-O-TOMETER test. Three cotton swatches were washed to remove the original textile finish. The initial L, a, and b values for each of the swatches was measured using a Minolta calorimeter. The swatches in each TERG-O-TOMETER were washed using 0.5 g/L of GREENCARE detergent (commercially available from Sainsbury in England), 10 weight percent, based on the weight of detergent, of Polymer A or Polymer E, except that no polymer was used to wash the control swatch, 110 ppm hardness water based on MgCl and CaCl, 93° F. and stirred at 80 rpm. A 20 minute wash and a 3 minute rinse were used. Each of the swatches was dried in a print drier or a standard clothes drier and then stained with spaghetti sauce (RAGU traditional). The stains were allowed to set overnight. The L, a and b values for each of the stained swatches was measured.

The stained swatches were washed using 0.9 g/L of GREENCARE detergent, 10 weight percent, based on the weight of detergent, of Polymer A or Polymer E, except that no polymer was used to wash the control swatch, 110 ppm hardness water based on $MgCl_2$ and $CaCl_2$, 93° F. and stirred at 80 rpm. A 20 minute wash and a 3 minute rinse were used. Each of the swatches was dried in a print drier or a standard clothes drier. The L, a and b values for each of the swatches was measured.

The $\Delta E$ for the stain on each swatch was calculated from the following equation:

$$\Delta E = [(L_1 - L_2)^2 + (a_1 - a_2)^2 + (b_1 - b_2)^2]^{0.5}$$

The percent soil removal for each swatch was calculated from the following equation:

$$\% \text{ soil removal} = \frac{\text{soil removed}}{\text{total soil}} \times 100 = \frac{\Delta Ea\text{-}s}{\Delta Eb\text{-}s} \times 100$$

wherein $\Delta Ea\text{-}s$ is the difference in E after the stain is put on and after the swatch with the stain is washed and $\Delta Eb\text{-}s$ is the difference between after the stain is put on and no stain at all. The soil removal test results for each of the swatches is summarized in Table 1.

TABLE 1

| Copolymer | % Soil Removal | Average % Soil Removal |
|---|---|---|
| Control (No polymer) | 50.87 | 53.92 |
|  | 57.00 |  |
|  | 53.91 |  |
| Polymer E | 62.91 | 59.19 |
|  | 56.05 |  |
|  | 58.60 |  |

TABLE 1-continued

| Copolymer | % Soil Removal | Average % Soil Removal |
|---|---|---|
| Polymer A | 58.13 | 56.64 |
|  | 54.92 |  |
|  | 56.88 |  |

The test results in Table 1 clearly show that Polymers A and E which were prepared in Examples 1 and 5, respectively, provided the cotton swatches with excellent soil release. In addition, Polymers A and E provided the cotton swatches with significantly greater soil release than the Control swatch which was stained and washed in detergent but without the polymer of the present invention.

While the invention has been described with particular reference to certain embodiments thereof, it will be understood that changes and modifications may be made by those of ordinary skill in the art within the scope and spirit of the following claims.

What is claimed is:

1. In a cleaning composition comprising at least one surfactant, the improvement comprises adding a water-soluble or water-dispersible amino acid copolymer having pendent polysaccharide moieties having the structure

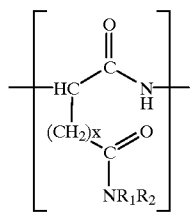

[a]

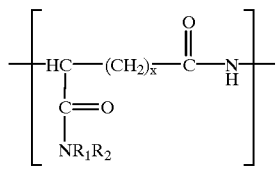

[b]

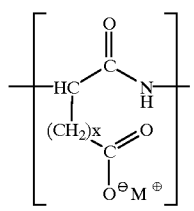

[c]

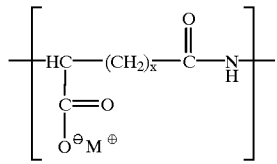

[d]

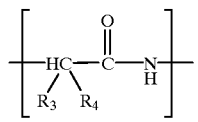

[e]

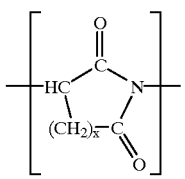

[f]

wherein x is independently 1 or 2; $M^+$ is a cation selected from the group consisting of H+, ammonium, alkali metals, alkaline earth metals, $Zn^{2+}$, $Cu^{2+}$, quaternary organic amines, amino acids, and protonated amino saccharides; units [a], [b], [c], [d], [e] and [f] are present in random order; the mole percent of (a+b) is from 5 to 100; the mole percent of (c+d) is from 0 to 95; the mole percent of (e) is from 0 to 95; the mole percent of (f) is from 0 to 95; $R_1$ and $R_2$ are independently selected from the group consisting of hydrogen, an alkyl group having 1 to 4 carbon atoms, and a saccharide moiety; provided that at least one of $R_1$ or $R_2$ is a saccharide moiety; $R_3$ and $R_4$ are independently selected from the group consisting of hydrogen, an alkyl group having 1 to 12 carbon atoms, and a residue of an amino acid other than aspartic acid and glutamic acid.

2. In a cleaning composition comprising at least one surfactant, the improvement comprises adding a water-soluble or water-dispersible amino acid copolymer having pendent polysaccharide moieties having the structure

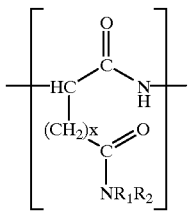

[a]

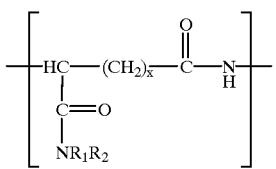

[b]

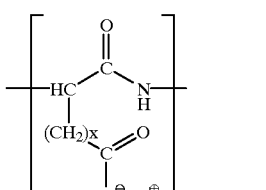

[c]

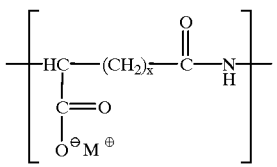

[d]

[e]

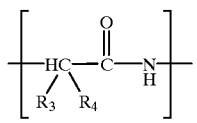

[f]

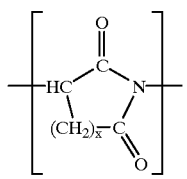

wherein x is independently 1 or 2; M⁺ is a cation selected from the group consisting of H+, ammonium, alkali metals, alkaline earth metals, $Zn^{2+}$, $Cu^{2+}$, quaternary organic amines, amino acids, and protonated amino saccharides; units [a], [b], [c], [d], [e] and [f] are present in random order; the mole percent of (a+b) is from 5 to 100; the mole percent of (c+d) is from 0 to 95; the mole percent of (e) is from 0 to 95; the mole percent of (f) is from 0 to 95; $R_1$ and $R_2$ are independently selected from the group consisting of hydrogen, an alkyl group having 1 to 4 carbon atoms, and a saccharide moiety having the structure (I)

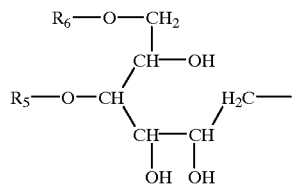

(I)

wherein $R_5$ is hydrogen or is represented by structure I(a)

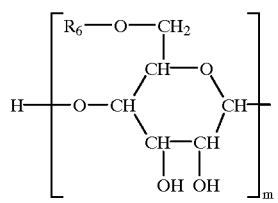

(I(a))

and $R_6$ is hydrogen or is represented by structure I(a) or structure I(b)

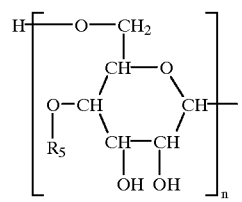

(I(b))

provided that at least one of $R_1$ or $R_2$ is a saccharide moiety; $R_3$ and $R_4$ are independently selected from the group consisting of hydrogen, an alkyl group having 1 to 12 carbon atoms, and a residue of an amino acid other than aspartic acid and glutamic acid; and (m+n) is greater than or equal to 0.

3. A method of cleaning comprising preparing a cleaning composition comprising the amino acid copolymer having pendent polysaccharide moieties according to claim 1, contacting the cleaning composition with one or more articles, wherein at least one of the articles contains soil, and removing at least a portion of the soil from the article containing soil.

4. The method of cleaning according to claim 3 wherein the cleaning composition further comprises at least one additive selected from the group consisting of builders, surfactants, ion exchangers, alkalies, anticorrosion materials, antiredeposition materials, antistatic agents, optical brighteners, perfumes, fragrances, dyes, fillers, chelating agents, enzymes, fabric whiteners, brighteners, sudsing control agents, solvents, hydrotropes, bleaching agents, bleach precursors, buffering agents, soil removal agents, soil release agents, fabric softening agent, and opacifiers.

5. A method of imparting soil resistance to an article comprising preparing a cleaning composition comprising the amino acid copolymer having pendent polysaccharide moieties according to claim 1, and contacting the cleaning composition with an article to provide soil resistance to the article.

6. A method of cleaning comprising preparing a cleaning composition comprising the amino acid copolymer having pendent polysaccharide moieties according to claim 2, contacting the cleaning composition with one or more articles, wherein at least one of the articles contains soil, and removing at least a portion of the soil from the article containing soil.

7. A method of imparting soil resistance to an article comprising preparing a cleaning composition comprising the amino acid copolymer having pendent polysaccharide moieties according to claim 2, and contacting the cleaning composition with an article to provide soil resistance to the article.

* * * * *